US008237721B2

(12) United States Patent
Douglas et al.

(10) Patent No.: US 8,237,721 B2
(45) Date of Patent: Aug. 7, 2012

(54) INFORMATION HANDLING SYSTEM AND METHOD FOR USING MAIN LINK DATA CHANNELS

(75) Inventors: David W. Douglas, Austin, TX (US); Jeffrey Thelen, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 625 days.

(21) Appl. No.: 12/427,827

(22) Filed: Apr. 22, 2009

(65) Prior Publication Data

US 2010/0271389 A1 Oct. 28, 2010

(51) Int. Cl.
*G06F 13/14* (2006.01)

(52) U.S. Cl. ........................................ 345/520; 345/501

(58) Field of Classification Search .................. 345/520, 345/501; 370/468

See application file for complete search history.

(56) References Cited

U.S. PATENT DOCUMENTS

| | | | | |
|---|---|---|---|---|
| 2003/0033569 | A1 * | 2/2003 | Klein Middelink et al. | 714/751 |
| 2004/0057461 | A1 * | 3/2004 | Dawidowsky et al. | 370/468 |
| 2007/0103204 | A1 | 5/2007 | Egan et al. | |
| 2007/0206640 | A1 | 9/2007 | Egan et al. | |
| 2007/0206641 | A1 | 9/2007 | Egan | |
| 2007/0206642 | A1 | 9/2007 | Egan et al. | |
| 2007/0206643 | A1 | 9/2007 | Egan et al. | |
| 2007/0257923 | A1 | 11/2007 | Whitby-Strevens | |
| 2008/0204285 | A1 | 8/2008 | Carter et al. | |
| 2008/0205634 | A1 | 8/2008 | Goodman | |

* cited by examiner

*Primary Examiner* — Jeffery A Brier
(74) *Attorney, Agent, or Firm* — Larson Newman, LLP

(57) ABSTRACT

A method of providing information for display includes receiving primary, secondary, and tertiary information for display at an information handling system. The tertiary information is communicated to a display interface after the primary and secondary information during a time period otherwise assigned to the communication of dummy information. This allows more information to be communicated via a communication channel.

19 Claims, 3 Drawing Sheets

INFORMATION HANDLING SYSTEM AND METHOD FOR USING MAIN LINK DATA CHANNELS

FIELD OF THE DISCLOSURE

This disclosure relates generally to information handling systems, and more particularly to display interfaces of an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Information handling systems are sometimes used to generate, process, and display visual information. For example, an information handling system can generate and process information to be displayed at a display device. However, video information can require a large communication bandwidth to communicate efficiently.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

Figure 1:
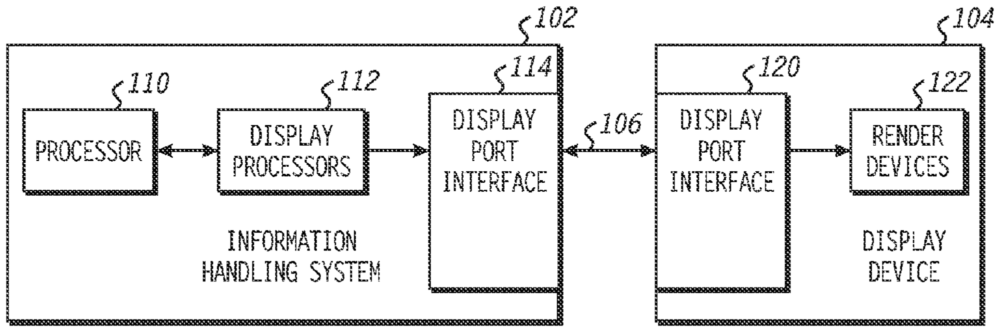
FIG. 1 illustrates a block diagram of an information handling system in accordance with one embodiment of the present disclosure.

FIG. 1 illustrates a block diagram of an exemplary embodiment of an information handling system 102 connected to a display device 104 via a connector 106. The connector 106 can be a cable, wire, or other physical connector configured to communicate information. In the illustrated embodiment, the connector 106 is assumed to comply with the DisplayPort digital display interface standard.

The information handling system 102 includes a processor 110 connected to a set of display processors 112. The display processors 112 are connected to a DisplayPort interface 114, which is connected to the connector 106. The processor 110 is a data processor device configured to execute one or more computer programs or other sets of instructions in order to perform specified tasks. In conjunction with executing the one or more computer programs or other instructions, the processor 110 can generate information to be displayed, such as visual display (e.g. video) information, audio information, or the like. The processor 110 provides the information to be displayed to the display processors 112.

The display processors 112 include one or more processors configured to generate and process display information based on information received from the processor 110. Examples of display processors can include graphics processors, audio codecs, and the like. Thus, each display processor can process a different type of information to be displayed, such as video or audio information. In an embodiment, the functions performed by the display processors 112 can be performed at the processor 110, which interfaces directly with the DisplayPort interface 114.

The DisplayPort interface 114 is configured to receive information to be displayed from the display processors 112 and to provide a logical and physical layer interface to communicate the received information via the connector 106. In particular, the DisplayPort interface 114 can format the received information so that the information can be communicated in compliance with the DisplayPort digital display interface standard. Thus, the DisplayPort interface 114 can format the received information into different communication lanes, and format the symbols to be communicated via each lane, as set forth in the DisplayPort standard.

The DisplayPort interface 114 can further be configured to format the received information so that tertiary information, in addition to primary (i.e. video) information and secondary (i.e. audio) information can be communicated via the interface 106. In particular, the DisplayPort standard employs dummy data symbols so that control information communicated in a DisplayPort communication stream is communicated at regular intervals. The amount of dummy data symbols communicated between control information can vary based on the amount of primary information communicated between control information. For example, the amount of primary information can vary depending on the resolution of video information to be displayed. The DisplayPort interface 114 can determine the amount of space available to communicate dummy symbols and, rather than communicate dummy data symbols, stuff the space available with tertiary information. This can be better understood with reference to FIG. 2.

Figure 2:
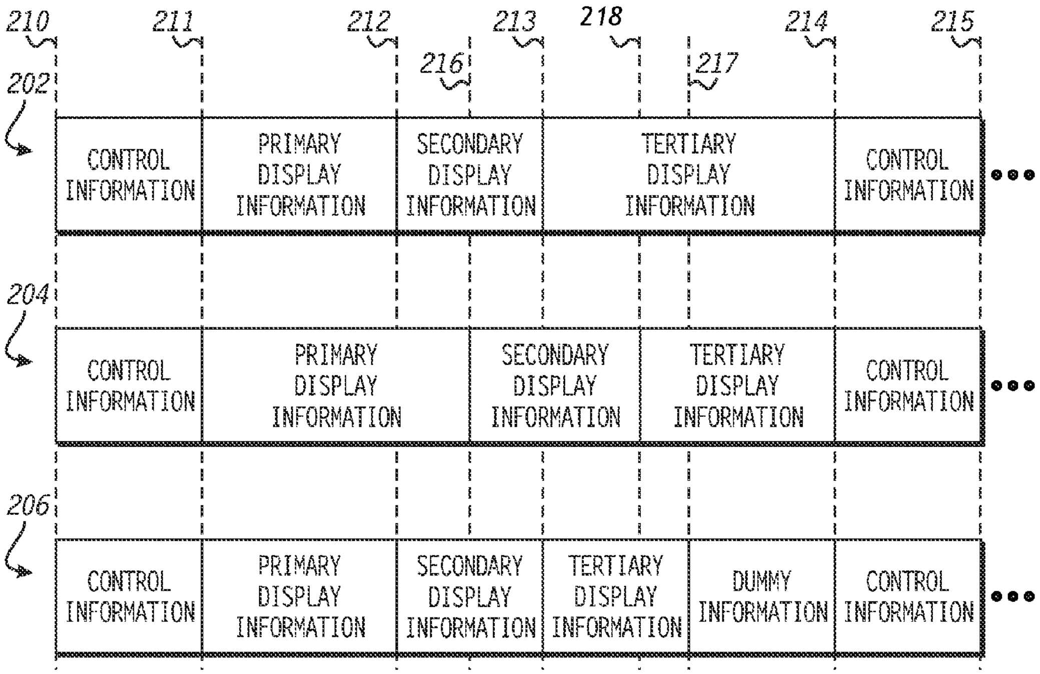
FIG. 2 illustrates a diagram of information streams between an information handling system and a display device in accordance with one embodiment of the present disclosure.

FIG. 2 illustrates example data streams 202, 204 and 206 to be communicated via the DisplayPort connector 106. In an embodiment, the data streams 202, 204, and 206 can represent data streams associated with different communication lanes of the DisplayPort connector 106. In another embodiment, the data streams 202, 204, and 206 can represent different potential data streams communicated via the DisplayPort connector 106, with the particular stream communicated based on the amount of primary and secondary information to be communicated.

With respect to data stream 202, the DisplayPort interface 114 determines that a relatively small amount of primary information will be communicated. Accordingly, the DisplayPort interface 114 forms symbols for communication so that, between time 210 and time 211 control information is communicated via the interface. Further, the symbols are arranged so that primary display information is communicated between times 211 and 212, while secondary display information is communicated between times 212 and 213. In addition, the DisplayPort interface 114 determines that there is time available before the next control information is to be communicated, at time 214. Accordingly, the DisplayPort interface 114 communicates tertiary display information between times 213 and 214. Between times 214 and 215 the DisplayPort interface again communicates control information in order to comply with the DisplayPort standard.

Referring to data stream 204, the DisplayPort interface 114 communicates control information between times 210 and 211, then communicates primary display information between times 211 and 216 and secondary display information between times 216 and 218. As illustrated, for data stream 204, the amount of primary display information to be communicated is relatively larger than for data stream 202. Accordingly, there is less time available to communicate tertiary display information between times 218 to 214. Thus, less tertiary display information may be communicated between instances of control information as compared to data stream 202.

Referring to data stream 206, the stream is similar to data stream 202 in that control information is communicated between time 210 and 211, primary display information is communicated between time 211 and 212, and secondary display information is communicated between time 212 and 213. However, for data stream 206, the DisplayPort interface 114 determines that there are not enough symbols of tertiary display information to communicate before control information is again communicated at time 214. Accordingly, the DisplayPort interface 114 communicates tertiary display information between time 213 and time 217, and then communicates dummy information, such as one or more dummy symbols, between time 217 and time 214, when control information is again communicated.

Thus, in the illustrated embodiment of FIG. 2, the DisplayPort interface communicates primary, secondary and tertiary display information between instances of communicating control information. Examples of control information including timing or clock information, security and digital rights management information, and the like. Primary display information can be information, such as visual information, communicated to a display device where display of the primary information can take precedence over display of tertiary display information. For example, primary display information can include a television or movie program, display information to display computer applications for interface by a user, and the like. Secondary display information can refer to a different type of information to be displayed at the display device, such as audio information. Tertiary display information can refer to information other than primary or secondary information to be communicated to the display device for display or otherwise. Examples of tertiary information can include images to be superimposed over the primary display information, such as fonts, graphics, and the like, graphical user interface information to be displayed in conjunction with the primary display information, metadata such as timestamps or other information associated with the primary or secondary display information, encryption key information, tele-text, parental controls information, closed captioning information, picture-in-picture information, stereoscopic display information, such as information used in conjunction with the primary display information to provide a three-dimensional image, and the like. In an embodiment, the tertiary display information can be used as a forward channel for another connection with a display device, such as a universal serial bus (USB) 3.0 channel. Thus, providing the tertiary display information via the space previously reserved for dummy information provides a convenient and flexible way to communicate this information to a display device, improving communication bandwidth and reducing the number of connections with the display device.

Referring again to FIG. 1, the display device 104 includes a DisplayPort Interface 120 connected to the connector 106, and further connected to a set of render devices 122. The DisplayPort Interface 120 is configured to extract the primary, secondary, and tertiary display information from received data streams and provide the extracted information to the render devices 122. The render devices 122 are devices configured to receive the information and render it so that the information is provided to a user. Examples of render devices include visual rendering devices, such as a display screen and associated hardware, and audio rendering devices, such as speakers and associated hardware. In an embodiment, the DisplayPort interface or other device at the display device 104 can communicate different types of information extracted from the data streams to different rendering devices. Thus, audio information can be provided to one or more audio devices for rendering, while video information is provided to a visual rendering device for display. Tertiary information can also be used for other functions at the display device 104, such as decryption, authentication, and the like.

Figure 3:
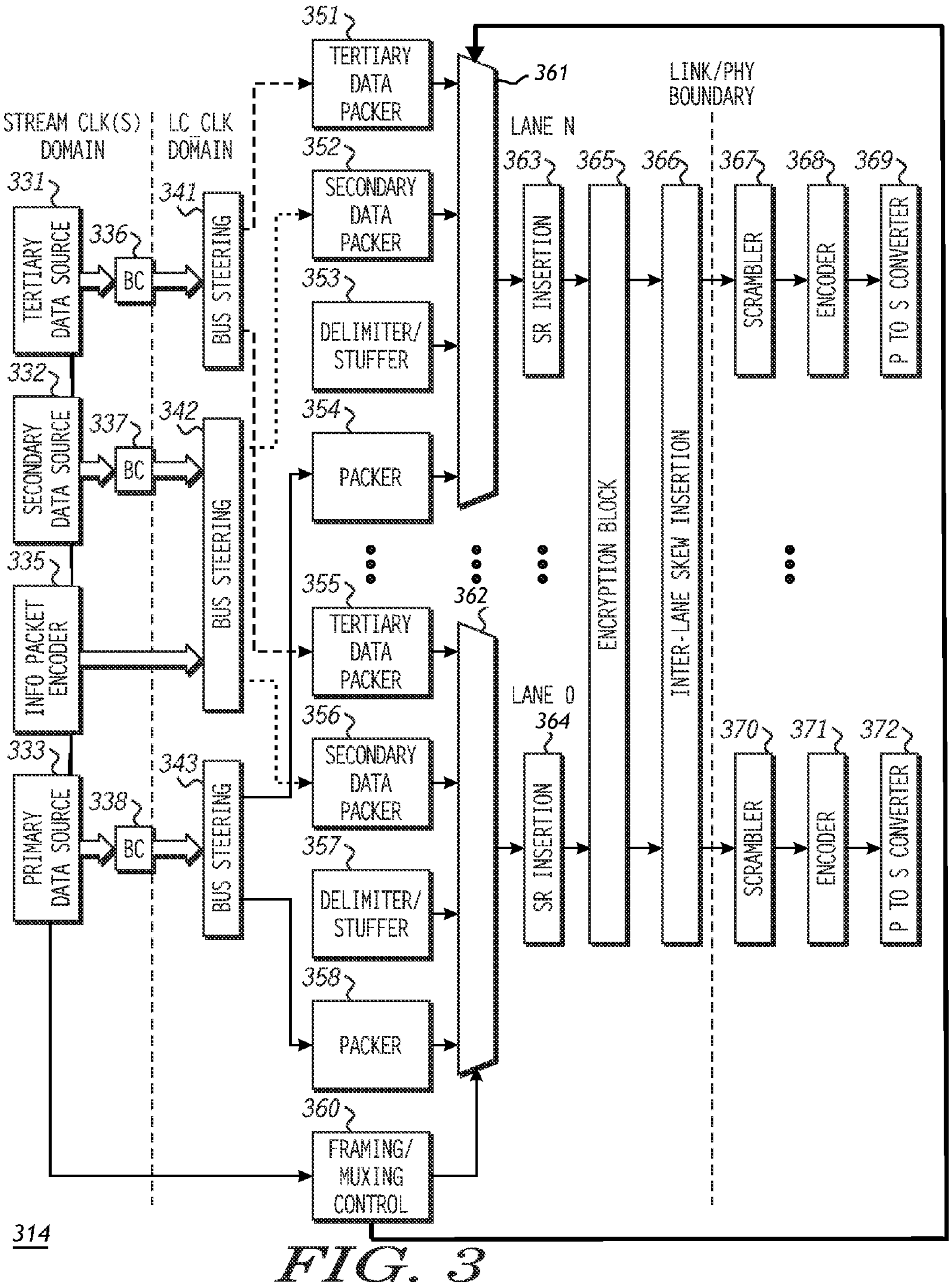
FIG. 3 illustrates a block diagram of a display interface in accordance with one embodiment of the present disclosure.

Referring to FIG. 3, a block diagram of a particular embodiment of a DisplayPort interface 314, corresponding to the DisplayPort interface 114 of FIG. 1, is illustrated. The DisplayPort interface 314 includes a primary data source 333, a secondary data source 332, and a tertiary data source 331. In an embodiment, each of the data sources 331-333 represents an input port configured to receive tertiary, secondary, and primary display information, respectively. The primary data source 333 is connected to an information packet encoder 335, a bus controller 338, and a framing/muxing control module 360. The secondary data source 332 is connected to the information packet encoder 335, a bus controller 337, and the tertiary data source 331. The tertiary data source 331 is connected to secondary data source 332 and a bus controller 336.

The bus controllers 336, 337, and 338 are connected to bus steering modules 341, 342, and 343, respectively. The bus steering module 341 is connected to tertiary data packers 351 and 355, while the bus steering module 342 is connected to secondary data packers 352 and 356. Bus steering module 343 is connected to packers 354 and 358. A multiplexer 361 includes inputs connected to tertiary data packer 351, secondary data packer 352, a delimiter/stuffer 353, and packer 354. A multiplexer 362 includes inputs connected to tertiary data packer 355, secondary data packer 356, a delimiter/stuffer 357, and packer 358. Multiplexers 361 and 362 also each include a control input connected to the framing/muxing control module 360.

The DisplayPort interface 314 also includes an SR insertion module 363, connected to an output of multiplexer 361, and an SR insertion module 364, connected to an output of multiplexer 362. The DisplayPort interface 314 further includes an encryption block 365 connected to the SR insertion modules 363 and 364, and an inter-lane skew insertion module 366. DisplayPort interface 314 also includes a scrambler 367, an encoder 368, and a parallel-to-serial converter 369. The scrambler 367 includes an input connected to the inter-lane skew connected interface 366 and an output connected to an input of the encoder 368. The encoder 368 also includes an output connected to the parallel-to-serial converter 369. The parallel-to-serial converter 369 includes an output (not shown) connected to the connector 106. In addition, DisplayPort interface 314 also includes a scrambler 370, an encoder 371, and a parallel-to-serial converter 372. The scrambler 370 includes an input connected to the inter-lane skew connected interface 366 and an output connected to an input of the encoder 371. The encoder 371 also includes an output connected to the parallel-to-serial converter 372. The parallel-to-serial converter 372 includes an output (not shown) connected to the connector 106.

It will be appreciated that, in the illustrated embodiment of FIG. 3, the illustrated hardware supports two DisplayPort lanes. In other embodiments, the DisplayPort interface 314 can include additional packers (including tertiary, secondary, and primary data packers), delimiters/stuffers, multiplexers, SR insertions modules, scramblers, encoders, and parallel-to-serial interfaces configured similarly to the illustrated arrangement to support additional communication lanes.

In operation, the data sources 331-333 provide tertiary, secondary, and primary display information, respectively, to the associated bus controllers 336-338. Each of the bus controllers 336-338 controls the corresponding one of the bus steering modules 341-343 to route the received information to the corresponding packer in each lane. For example, bus steering module 341 routes received information to the tertiary data packers 351 and 355, depending on the lane associated with the received information. Each of the packers packs the received information into one or more symbols for communication. Thus, for example, the secondary data packers 352 and 356 pack secondary display information into one or more symbols for communication. The delimiter/stuffers 353 and 357 provide control information for packing, as well as any dummy symbols. The framing/muxing control module 360 provides control signals so that control information and primary, secondary, and tertiary display information are communicated according to regular intervals, such that each type of information is packed into a designated portion of each interval, as illustrated in FIG. 2. This ensures that the packed information can be decoded at the display device 104.

The SR insertion modules 363 and 364 can provide additional control information for each interval. The encryption block 365 can encrypt received information based on a defined or programmable encryption key. The inter-lane skew insertion module 366 can modify the timing of the data stream associated with each lane, so that there is a deterministic relationship between the information communicated in each lane.

The scramblers 367 and 370, encoders 368 and 371, and parallel-to-serial converters 369 and 372 provide a physical layer interface to the data connector 106 for the associated lane. Thus, these devices ensure that the packed symbol information is communicated according to the appropriate physical parameters for receipt at the DisplayPort interface 120.

Figure 4:
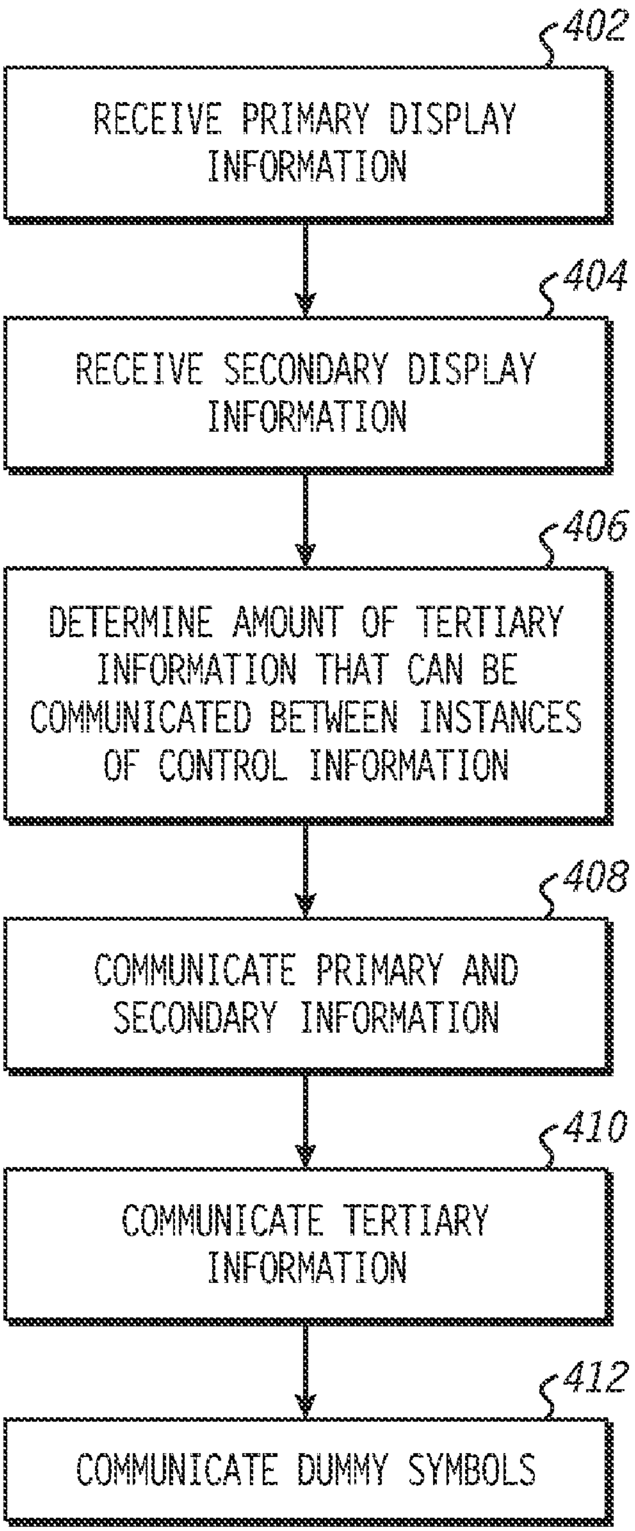
FIG. 4 illustrates a flow diagram of a method of communicating information to a display device in accordance with one embodiment of the present disclosure.

Referring to FIG. 4, a flow diagram of a method of communicating information via a DisplayPort interface in accordance with one embodiment of the present disclosure is illustrated. At block 402, primary display information is received at a DisplayPort interface. At block 404, secondary display information is received at the DisplayPort interface. At block 406, the DisplayPort interface determines an amount of tertiary information to be communicated between instances of control information, header information, or the like. This determination can be made based on a number of factors. For example, the determination can be made based on a display resolution setting associated with the primary display information. In addition, the determination can be made based on the amount of primary display information to be communicated, the amount of secondary display information to be communicated, or a combination thereof.

At block 408, a portion of primary information and a portion of secondary information are communicated between instances of control or header information being communicated in accordance with the DisplayPort standard. At block 410, a portion of tertiary information is communicated based on the amount of available space determined at block 406. At block 412, dummy symbols can be communicated between instances of control or header information, in the event that the amount of tertiary information to be communicated does not fill the available space.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method, comprising:

receiving at a display interface of an information handling system primary information for display;

receiving at the display interface secondary information for display;

determining based on the primary information a first amount of tertiary information to be communicated;

communicating a first instance of control information and a second instance of control information from the display interface via a first data stream;

communicating a first portion of the primary information from the display interface after the first instance of control information and prior to the second instance of control information, the first portion primary information communicated via the first data stream; and communicating a first portion of the tertiary information from the display interface after the first instance of control information and prior to the second instance of control information, a size of the first portion of the tertiary information based on the first amount, the first portion of tertiary information communicated via the first data stream.

2. The method of claim 1, further comprising communicating the secondary information via the first data stream.

3. The method of claim 2, wherein the primary information comprises information for visual display and the secondary information comprises audio information.

4. The method of claim 3, wherein the tertiary information comprises graphical user interface information for visual display.

5. The method of claim 3, wherein the tertiary information comprises overlay information for visual display.

6. The method of claim 3, wherein the tertiary information comprises encryption information.

7. The method of claim 3, wherein the tertiary information comprises closed captioning information.

8. The method of claim 3, wherein the tertiary information comprises picture-in-picture information for visual display.

9. The method of claim 3, wherein the tertiary information comprises stereoscopic information for visual display.

10. The method of claim 3, wherein the tertiary information comprises forward channel information for a universal serial bus (USB) interface.

11. The method of claim 1, wherein the display interface is a DisplayPort interface.

12. The method of claim 1, wherein determining the first amount comprises determining the first amount based on a display resolution.

13. The method of claim 1, further comprising:

communicating via the first data stream a dummy symbol from the display interface after the first instance of control information and prior to the second instance of control information.

14. A method, comprising:

receiving at a display device a first data stream;

decoding the first data stream at the display device to determine a first instance of control information and a second instance of control information;

decoding the first data stream at the display device to determine primary information communicated between the first instance of control information and the second instance of control information;

decoding the first data stream at the display device to determine secondary information communicated between the first instance of control information and the second instance of control information;

decoding the first data stream at the display device to determine tertiary display information communicated between the first instance of control information and the second instance of control information, the amount of tertiary display information based on an amount of the primary display information; and displaying first visual information based on the primary information at the display device.

15. The method of claim 14, further comprising:

displaying second visual information based on the tertiary information at the display device.

16. The method of claim 14, wherein receiving the first data stream comprises receiving the first data stream via a DisplayPort interface.

17. An information handling system comprising:

a processor configured to provide primary, secondary, and tertiary information; and a display interface coupled to the processor, the display interface configured to:

receive the primary, secondary, and tertiary information;

determining based on the primary information a first amount of the tertiary information to be communicated;

communicating a first instance of control information and a second instance of control information via a first data stream;

communicating a first portion of the primary information via the first data stream after the first instance of control information and prior to the second instance of control information; and communicate a first portion of the tertiary information via the first data stream after the first instance of control information and prior to the second instance of control information, a size of the first portion of the tertiary information based on the first amount.

18. The information handling system of claim 17, wherein the display interface comprises a DisplayPort interface.

19. The information handling system of claim 17, wherein the primary information comprises information for visual display and the secondary information comprises audio information.

* * * * *